United States Patent [19]

Nagahori

[11] 4,214,181
[45] Jul. 22, 1980

[54] SELF-STARTING MINIATURE SYNCHRONOUS MOTORS

[75] Inventor: Yukihiro Nagahori, Kawasaki, Japan

[73] Assignee: Jeco Co., Ltd., Kawasaki, Japan

[21] Appl. No.: 822,687

[22] Filed: Aug. 8, 1977

[51] Int. Cl.² .......................................... H02K 21/00
[52] U.S. Cl. ............................. 310/162; 310/40 MM; 310/156; 310/186
[58] Field of Search ................... 310/40 MM, 49, 156, 310/162, 163, 164, 186–188, 112; 58/23 D

[56] References Cited

U.S. PATENT DOCUMENTS

| | | | |
|---|---|---|---|
| 2,704,334 | 3/1955 | Brailsford | 310/40 MM |
| 2,780,764 | 2/1957 | Morrison | 310/163 |
| 3,256,453 | 6/1966 | Haydon | 310/163 |
| 3,469,131 | 9/1969 | Stellwagen | 310/162 |
| 3,818,690 | 6/1974 | Schwarzschild | 310/49 |
| 3,949,251 | 4/1976 | Takatsuki | 58/23 D |
| 3,984,972 | 10/1976 | Yoshino | 58/23 D |
| 4,017,851 | 4/1977 | Felice | 310/49 |
| 4,048,548 | 9/1977 | Nakajama | 310/49 |
| 4,088,909 | 5/1978 | Matsumara | 310/49 |

Primary Examiner—R. Skudy
Attorney, Agent, or Firm—Charles E. Pfund

[57] ABSTRACT

The motor comprises a rotor, first and second stators surrounding the rotor and a common exciting coil for the stators. The rotor is provided with a plurality of spaced pole pairs of alternate polarities of an odd number equal to or larger than 5. The first and second stators are respectively provided with semicircular portions which face each other and the centers of these semicircular portions are displaced from the axis of rotation of the rotor such that the semicircular portions will be point symmetrical with respect to the axis of rotation. Main pole pieces are provided for respective semicircular portions at the adjacent portions thereof and interpole pieces are located adjacent the main pole pieces which are located closest to the rotor. Notches are formed between adjacent main and interpole pieces.

6 Claims, 3 Drawing Figures

SELF-STARTING MINIATURE SYNCHRONOUS MOTORS

BACKGROUND OF THE INVENTION

This invention relates to a miniature synchronous motor, more particularly to a self-starting miniature synchronous motor.

Although various types of motors of the kind described above have been, a satisfactory one is not yet available which can self-start always in a definite direction and can produce relatively large torque. For example, according to a synchronous motor disclosed in U.S. Pat. No. 3,256,453 N and S magnetic poles are alternately arranged about the periphery of the rotor and a plurality of stator arms each having a pole face are disposed to surround the rotor. With this construction, however, since the number of pairs of poles is an even number, for example 8, when one of the stator main poles is magnetized to produce a repulsive force between it and an opposed rotor pole (for example N pole), the other stator main pole which is diametrically opposite to said one stator main pole does not produce any repulsive force between it and the other rotor pole (N pole) which is diametrically opposite to said rotor pole but creates a attractive force between it and a rotor pole (S pole) adjacent said other rotor pole. In other words, the rotor torque is not produced by diametrically opposite rotor poles so that the rotor shaft will be subjected to side pressure which causes one sided wear of the shaft as well as shortening of the motor life. Furthermore, with this construction, one pair of rotor poles is always idle thus decreasing the efficiency of utilization of the poles.

According to another example disclosed in U.S. Pat. No. 3,984,972, the motor comprises a rotor including a diametrically opposite poles and a stator having two semicircular opposing portions encircling the rotor, the semicircular opposing portions being disposed in a point symmetrical relationship with respect to the rotor shaft. With this construction, however, if the frequency of the stepping pulse supplied to a coil common to stator portions were too high, when the rotor rotates by being supplied with a driving pulse, before the rotor stops at a stable position due to rotor inertia the next driving pulse would be applied thereby resulting in a hunting. Furthermore, as this motor is of the stepping pulse drive type if it is energized by an alternating current pulse having no zero amplitude interval between adjacent driving pulses the rotor will often assume stable stopping state in which the rotor does not rotate. For this reason, the motor of this construction could be operated only with a stepping pulse having a relatively low frequency.

SUMMARY OF THE INVENTION

Accordingly, it is an object of this invention to provide a self-starting miniature synchronous motor having an improved starting characteristic.

Another object of this invention is to provide an improved self-starting miniature synchronous motor which is not affected by the waveform of the drive source, in other words can be driven by any AC driving source.

Still another object of this invention is to provide a novel self-starting miniature synchronous motor in which the shaft of the rotor would not be subjected to one-sided wear.

According to this invention, there is provided a self-starting miniature synchronous motor characterized in that there are provided a rotor having a plurality of equally spaced poles of alternate polarities, that the number of the rotor poles N is equal to or larger than 5, where n represents an odd integer, a pair of first and second stators having opposed semicircular portions of the same diameter and are arranged to surround the rotor, and a single exciting coil for exciting the pair of stators, that the centers the semicircular portions of the pair of stators are located at points displaced from the axis of rotation of the rotor such that the semicircular portions will be point symmetrical with respect to the axis of rotation of the rotor and that the semicircular portions of the first and second stators are respectively formed with main pole pieces at the adjacent portions thereof, notches at other portions and interpole pieces adjacent the main pole pieces which are located closest to the rotor.

BRIEF DESCRIPTION OF THE DRAWINGS

In the accompanying drawings

DESCRIPTION OF THE PREFERRED EMBODIMENTS

Figure 1:
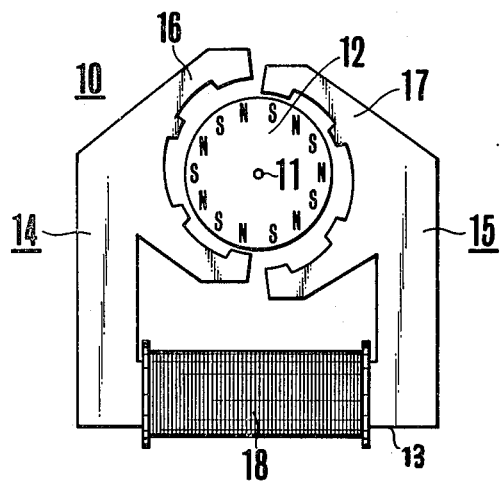
FIG. 1 is a diagrammatic plan view showing the basic construction of the self-starting miniature synchronous motor embodying the invention.

The self-starting miniature synchronous motor 10 embodying the invention and shown in FIG. 1 comprises a rotor 12 having a shaft 11 and made of such magnetic material as isotropic barium ferrite. Equally spaced N and S poles are alternately formed by magnetization around the periphery of the rotor 12 thus forming a total of n pole pairs. In this embodiment n is equal to 7. A pair of stators 14 and 15 are provided to surround the rotor, and these stators include stator poles 16 and 17 in the form of C or semicircular configurations facing the rotor. The ends of the stators opposite the stator poles are interconnected by a magnetic yoke 13 on which a single exciting coil is wound. Although not shown in the drawing, it should be understood that the rotor shaft 11 is supported by a frame.

The detail of the poles of the stators 14 and 15 and the rotor will now be described with reference to FIG. 2 in which the opposed semicircular portions of the stator poles 16 and 17 have the same radius and disposed symmetrically with respect to the axis of the rotor shaft 11. However, the centers p and q of the semicircular portions do not coincide with the axis of the shaft 11 but are slightly eccentric with respect to the axis. More particularly, these centers are point symmetrical with respect to the axis of the shaft 11 and equally spaced therefrom. The semicircular portions of the stator poles 16 and 17 are formed with main pole pieces 16a, 16b, 17a and 17b and interpole pieces 16c, 16d, 17c and 17d respectively and notches 19a, 20a; 19b, 20b; and 19c, 20c are formed between the main poles pieces 16a, 17a and interpole pieces 16c, 17c and between interpole pieces 16c, 17c and 16d, 17d, and between interpole pieces 16d, 17d and main pole pieces 16b, 17b respectively. The bottoms of these notches lie on circles having the same centers p and q as the semicircular portions respectively.

As above described since the centers of the semicircular portions of the stator poles are offset from the axis of rotor shaft, the main pole piece 16b of the stator pole 16 is closest to the rotor, and the distance to the rotor increases in the order of interpole pieces 16d and 16c and main pole piece 16a. On the other hand, the main pole piece 17a of the stator pole 17 is closest to the rotor and the distance to the rotor increases in the order of interpole pieces 17c, 17d and the main pole piece 17b. Accordingly, when one considers the relationship between adjacent main pole pieces and the rotor, the main pole piece 17a is closest to the rotor whereas the main pole piece 16a is located most remotely from the rotor. In the same manner, the main pole piece 16b is located closest to the rotor while the main pole piece 17b is located most remotely from the rotor.

The number of poles of the rotor and the number of pole pieces of the stator are determined under the following conditions so as to always apply a repulsive force to the rotor. Thus, one half of the number of rotor poles is equal to n, where n is an interger, 7 in this example, and the number of the stator pole pieces is selected to be equal to n+1,/2 that is 4 in this example.

When the number of poles of the rotor and the number of stator pole pieces are selected in this manner, the pole pieces 17a, 17b, 17c, 16a, 16b and 16d of the stator poles 16 and 17 will come to exactly confront N and S poles of the rotor respectively with the result that when the stator pole pieces are magnetized by the exciting coil 18, the attractive forces or repulsive forces created between the stator pole pieces and the rotor poles are all in the same direction and add to each other to create a torque. Since the semicircular portions of the stator poles are made eccentric with each other, the pole pieces 17d and 16c do not exactly confront the corresponding poles of the rotor, but they are located at such displaced positions as to increase the torque. In this manner, according to this invention it is possible to eliminate idle poles which are inherent to the construction taught by U.S. Pat. No. 3,256,453.

Figure 2:
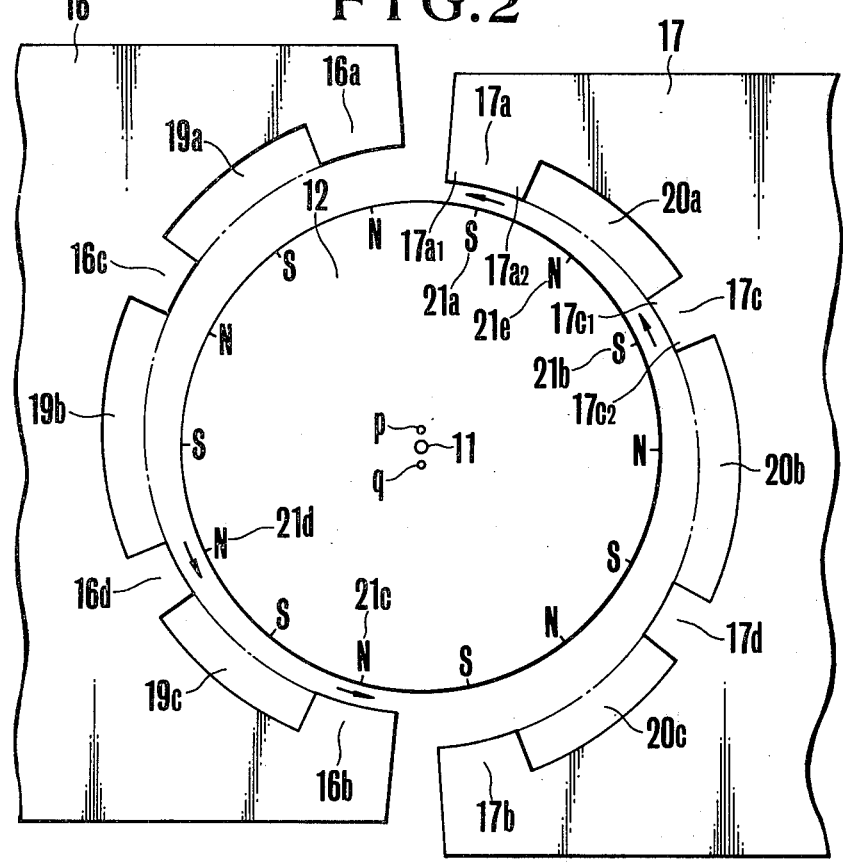
FIG. 2 is an enlarged view of a portion of the motor shown in FIG. 1.

Furthermore in accordance with this invention, the number of the rotor pole pairs is determined to be an odd number, (in this example 7) so that when the stator pole piece 17a comes to confront a S pole 21a of the rotor as shown in FIG. 2, a N pole 21c symmetrically opposite the pole 21a will confront the stator pole piece 16b. This means that when the stator pole piece 17a is magnetized to become a S pole so as to create a repulsive force between it and the rotor pole 21a, the stator pole piece 16b would be magnetized to become a N pole so that a repulsive force will also created therebetween. On the other hand, when the stator pole 17 is magnetized to act as a N pole and when the stator pole 16 is magnetized to act as a S pole attractive forces will be created between the rotor pole 21a and the stator pole piece 17a and between the rotor pole 21c and the stator pole piece 17b. Accordingly, it is possible to eliminate the problem of the one sided wear of the rotor shaft which has been inevitable in the construction shown in U.S. Pat. No. 3,256,453, thereby elongating the life of the motor.

In this invention, as can be understood from the description of operation to be described later n is an integer equal to or larger than 5 because interpole pieces are provided in addition to the main pole pieces.

The angular width of the main pole pieces 17a, 17b, 16a and 16b is selected to be about 65–75% of a value 360°/number of rotor poles whereas that of the interpole pieces to be 40 to 50%. When angular widths deviate from these values the torque of the motor would decrease greatly. Especially where the angular width of the main pole pieces is set to be 360°/number of rotor poles, the operating range of the exciting voltage of coil 18 will become narrow thus causing hunting.

The motor of this invention operates as follows.

Suppose now that when the rotor 12 is at standstill at a position shown in FIG. 2, a pulse voltage is impressed upon the exciting coil 18 to magnetize stator pole 17 to act as a S pole and stator pole 16 as a N pole. Then the lefthand portion 17a1 of the pole piece 17a is located closer to the S pole 21a of the rotor than the righthand portion 17a2, a repulsive force is created between the pole piece 17a and the S pole 21a so that the rotor 12 rotates in the counterclockwise direction. In the same manner, as the lefthand portion 17c1 of the interpole piece 17c is located closer to the S pole 21b of the rotor than the righthand portion 17c2 a repulsive force is also created between the interpole piece 17c and the S pole 21b of the rotor, with the result that the rotor is subjected to a torque also in the counterclockwise direction. In the same manner, a repulsive force is created between the stator pole pieces 16b and 16d and the N poles 21c and 21d of the rotor to rotate the rotor in the counterclockwise direction. When the rotor rotates a predetermined angle the repulsive force between the stator pole piece 17a the S pole 21a of the rotor 12 disappears and now an attractive force appears between a N pole 21e of the rotor adjacent the S pole 21a and the stator pole piece 17a. Similar attractive forces are created between other stator pole pieces and the other rotor poles, thus rotating the rotor until the N pole 21e of the rotor comes to confront the stator pole piece 17a. The angle of one step rotation caused by one pulse is equal to 360°/14=25.7°. When the excitation of the pole piece 17a disappears, the rotor will stop at a position in which the rotor has been slightly attracted toward the lefthand portion 17a1 of the stator pole piece 17a.

Upon application of a pulse voltage of the opposite polarity upon the exciting coil 18, similar operation would be repeated. Thus, by alternately applying positive and negative pulse voltages the rotor 12 is rotated stepwisely. Since notches 20a, 20b, 19a and 19b are formed between the main pole pieces and the interpole pieces, the magnetic forces between these notches and the rotor are considerably smaller than those created between the stator pole pieces and the rotor. Consequently, the magnetic forces created between the stator pole pieces 17a, 17c, 16b and 16d and the rotor poles are larger than those created in the prior art motor, thus increasing the torque. In addition, since the main pole pieces 16a and 17b are more remotely located from the rotor than the other main pole pieces the influence of these pole pieces 16a and 17b upon starting is not large but these pole pieces act to provide paths for the magnetic flux flowing between them and adjacent stator main pole pieces 17a and 16b.

As above described, according to this invention, since notches are provided for the stator poles, a suitable number of interpoles are provided between the main stator pole pieces and since the semicircular portions of the stator poles are eccentric and main pole pieces 16a and 17b are located more remotely from the rotor, a larger torque is applied to the rotor irrespective of the angular position thereof thus positively self-starting the rotor without the trouble of dead centers as in the prior art construction.

When a pulse voltage is impressed upon the exciting coil 18, the stator poles 16 and 17 are magnetized alternately in the opposite directions for creating attractive and repulsive forces between the stator pole pieces and the rotor poles whereby the rotor rotates at a speed corresponding to the frequency of the pulse voltage. When a pulse voltage having such low frequencies as one or two pulses per second is impressed upon the exciting coil the rotor rotates stepwisely at a speed corresponding to the pulse frequency in the counterclockwise direction, whereas when a pulse voltage having higher frequency as 25 or 35 Hz per second is applied to the exciting coil 18, the rotor will rotate continuously instead of a stepwise rotation. The direction of rotation is counterclockwise or clockwise. With these high frequencies, either a source of a pulse voltage having a unity duty ratio or a source of sine wave may be used.

In the above described embodiment, the semicircular portions of the stator poles 16 and 17 are provided with main pole pieces 16a, 16b, 17a and 17b and interpole pieces 16c, 16d, 17c and 17d which are separated by notches 19a, 19b, 19c, 20a, 20b and 20c respectively, so that at an instant when the notches come to confront the rotor poles the attractive and repulsive forces created therebetween are decreased. For this reason, no restraining force is created between the rotor poles and the stator poles as in the prior art construction. This advantage is independent of the frequency of the pulse voltage applied to the exciting coil 18. Thus, the motor of this invention operates stably without the troubles of hunting and dead centers over a wide frequency range of from low to high frequencies.

Where the motor is driven with a low frequency voltage, although the motor operates satisfactory with only the main stator pole pieces 17a, 17b, 16a and 16b, for the purpose of increasing the starting torque and for assuring stable operation it is advantageous to add interpole pieces 17c, 17d, 16c and 16d.

Figure 3:
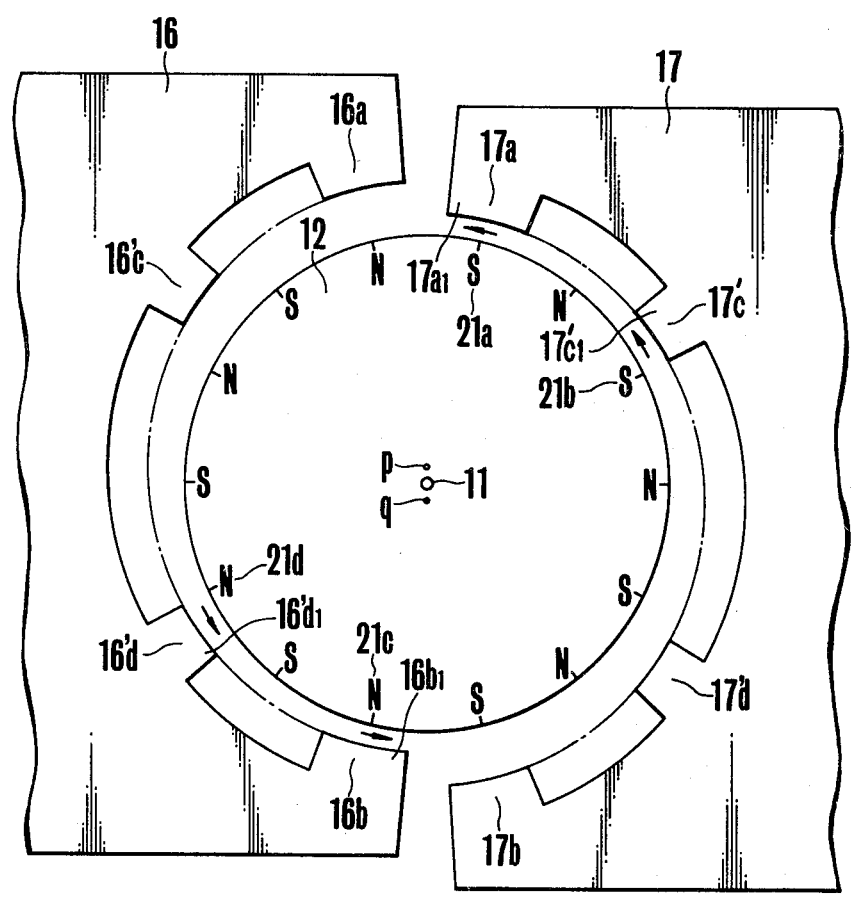
FIG. 3 is an enlarged view corresponding to FIG. 2 and showing a modified embodiment of this invention.

FIG. 3 shows a modified embodiment of this invention which is different from that shown in FIG. 2 in that the interpole piece 17'c is brought closer to main pole piece 17a by an angle of about 360°/number of rotor poles/4 than the interpole piece 17c shown in FIG. 2. In the same manner, the interpole piece 17'd is brought closer to the main pole piece 17b by an angle of about 360°/number of rotor poles/4 than the interpole piece 17d shown in FIG. 2. Furthermore, the interpole pieces 16'c and 16'd of the stator pole 16 are also displaced by an angle of about 360°/rotor pole number/4 toward the main pole pieces 16a and 16b when compared with the interpole pieces 16c and 16d shown in FIG. 2. The construction of other elements is the same as that of FIG. 2.

As above described in the embodiment shown in FIG. 3, although the main pole pieces 16a, 16b, 17a and 17b substantially exactly confront corresponding poles of the rotor as in the embodiment shown in FIG. 2, the interpole pieces 16'c, 16'd, 17'c and 17'd do not confront the rotor poles.

Suppose now that the rotor is at standstill at a position shown in FIG. 3. When a voltage is impressed upon the exciting coil 18 to magnetize the stator poles 16 and 17 to become N and S poles respectively. Then, an attractive force will be created between the lefthand portion 17'c1 of the interpole piece 17'c and the S pole 21b of the rotor thus applying a counterclockwise torque to the rotor. As above described, since the interpole piece 17'c is located closer to the main pole piece 7a than the interpole piece 17c shown in FIG. 2, the angular rotation at this moment is larger than that of FIG. 2. Accordingly, the S pole 21a of the rotor is brought closer to the lefthand portion 17a1 of the main pole piece 17a. In the same manner, similar attractive force is created between the righthand portion 16'd1 of the interpole piece 16'd and the rotor N pole 21d thus attracting the N pole 21c of the rotor toward the righthand portion 16b1 of the main pole piece 16b. For this reason, the attractive and repulsive forces between the rotor poles and the stator pole pieces are larger than those of FIG. 2, with the result that the rotor rapidly self-starts without the trouble of any dead center.

The other interpole pieces in FIG. 3 contribute little to the rotor torque so that they may be omitted. However, the interpole pieces 16'c and 17'd may be combined with the stator pole pieces because the stator poles 16 and 17 are symmetrical.

Although in the foregoing embodiments a single exciting coil 18 was wound about a common yoke each stator may be made up a stator pole and a yoke and the yokes of respective stator may be interconnected by a yoke wound with an exciting coil.

What is claimed is:

1. A self-starting miniature synchronous motor comprising a rotor provided with a plurality of equally spaced poles of alternate polarities; the number of the pole pairs n being equal to or larger than 5, where n represents an odd integer, a pair of first and second stators having opposed semicircular portions each of the same diameter and both stator diameters being greater than the diameter of the rotor and arranged to surround the rotor; a single exciting coil for exciting said pair of stators; the centers of the semicircular portions of said pair of stators being located at points displaced from the axis of rotation of said rotor such that said semicircular portions will be point symmetrical with respect to the axis of rotation of the rotor, the semicircular portions of the first and second stators being respectively formed with main pole pieces at the adjacent portions thereof, notches at other portions, and interpole pieces adjacent the main pole pieces which are located closest to said rotor, the radial spacing of said interpole pieces from said rotor being greater than the spacing of said main pole pieces located closest to said rotor and less than the spacing of the other main pole pieces from said rotor such that a large torque is applied to the rotor irrespective of the angular position thereof thus positively self-starting the rotor without a dead center condition.

2. The self-starting miniature synchronous motor according to claim 1 wherein said interpoles are located such that, when the main pole pieces of the first and second stators which are located closest to the rotor come to confront first rotor poles of one polarity, said interpoles come to confront the other poles of the rotor having the same polarity opposite as of said first rotor poles and located adjacent thereto.

3. The self-starting miniature synchronous motor according to claim 1 wherein said interpoles are located at such positions that, when the main pole pieces of the first and second stators which are located closest to the first rotor come to confront rotor poles of one polarity, said interpole pieces are brought to positions displaced by a predetermined angle toward said main pole pieces from the other rotor poles having a polarity opposite to that of said first rotor poles and located adjacent thereto.

4. The self-starting miniature synchronous motor according to claim 3 wherein said predetermined angle is equal to (360°/2n)/4.

5. The self-starting miniature synchronous motor according to claim 1 wherein the number of said main pole pieces and said interpole pieces provided for each semicircular portion is equal to (n+1)/2 and said main and interpole pieces and said notches are located to confront different ones of the rotor poles.

6. The self-starting miniature synchronous motor according to claim 1 wherein the interpole pieces between the main pole pieces formed at the opposite ends of each of said semicircular portions are located at positions displaced from first rotor poles of one polarity by a predetermined angle toward said main pole pieces when said main pole pieces come to confront other rotor poles having the same polarity as said first rotor poles and located adjacent thereto.

* * * * *